US010746954B2

(12) United States Patent
McCreight, Jr. et al.

(10) Patent No.: US 10,746,954 B2
(45) Date of Patent: Aug. 18, 2020

(54) OPTICAL SYSTEM RETAINING SYSTEM FOR VISION AUGMENTING SYSTEM

(71) Applicant: Photonis Defense, Inc., Lancaster, PA (US)

(72) Inventors: Robert Joseph McCreight, Jr., San Antonio, TX (US); James G. Burke, III, Londonderry, NH (US)

(73) Assignee: Photonis Defense, Inc., Lancaster, PA (US)

( * ) Notice: Subject to any disclaimer, the term of this patent is extended or adjusted under 35 U.S.C. 154(b) by 601 days.

(21) Appl. No.: 15/346,993

(22) Filed: Nov. 9, 2016

(65) Prior Publication Data

US 2017/0131514 A1    May 11, 2017

Related U.S. Application Data

(60) Provisional application No. 62/253,415, filed on Nov. 10, 2015.

(51) Int. Cl.
| | |
|---|---|
| *G02B 7/02* | (2006.01) |
| *G03B 17/14* | (2006.01) |
| *G02B 7/04* | (2006.01) |
| *G03B 3/02* | (2006.01) |

(52) U.S. Cl.
CPC .............. *G02B 7/026* (2013.01); *G02B 7/04* (2013.01); *G03B 17/14* (2013.01); *G03B 3/02* (2013.01)

(58) Field of Classification Search
CPC .......... G02B 7/026; G02B 7/04; G03B 17/14; G03B 3/02
See application file for complete search history.

(56) References Cited

U.S. PATENT DOCUMENTS

| | | | |
|---|---|---|---|
| 4,139,268 A | 2/1979 | Litman | |
| 6,449,419 B1 * | 9/2002 | Brough | ..................... F41G 1/35 385/136 |
| 2013/0129335 A1 | 5/2013 | Gainer | |
| 2014/0254033 A1 | 9/2014 | Leitzsch et al. | |

FOREIGN PATENT DOCUMENTS

| | | |
|---|---|---|
| EP | 2 065 742 A1 | 6/2009 |
| WO | 2013027310 A1 | 2/2013 |

OTHER PUBLICATIONS

International Search Report and Written Opinion of the International Searching Authority, dated Jan. 26, 2017, from International Application No. PCT/US2016/061055, filed on Nov. 9, 2016. Ten pages.
International Preliminary Report on Patentability, dated May 15, 2018, from International Application No. PCT/US2016/061055, filed on Nov. 9, 2016. Seven pages.

* cited by examiner

*Primary Examiner* — Alicia M Harrington
(74) *Attorney, Agent, or Firm* — HoustonHogle LLP

(57) ABSTRACT

An optical system retaining system for vision augmenting system prevents the unintended removal of the optical system but does not require disassembly of the augmenting system to remove the optical system.

20 Claims, 11 Drawing Sheets

PRIOR ART

OPTICAL SYSTEM RETAINING SYSTEM FOR VISION AUGMENTING SYSTEM

RELATED APPLICATIONS

This application claims the benefit under 35 USC 119(e) of U.S. Provisional Application No. 62/253,415, filed on Nov. 10, 2015, which is incorporated herein by reference in its entirety.

BACKGROUND OF THE INVENTION

Night vision systems generally comprise a number of components. A front collection lens system collects light, such as infrared light, from the environment and relays the light to a night vision tube. The collection lens system also typically provides for focus adjustment. The tube magnifies the number of received photons. In a typical tube, incoming light strikes a photocathode plate causing the emission of electrons through a microchannel plate. The electrons then form an image on a photocathode. At the proximal end, an eye piece then conditions the image for the viewer and typically provides diopter adjustment. The tube is usually contained within a housing that is threaded at either end to mate with the front collection lens system and the eye piece lens system.

In general, it is not uncommon for the night vision systems to be disassembled and/or repaired and/or upgraded. For example, the collection lens system or the eyepiece lens system could become damaged through impact. Moreover, this disassembly and/or repair and/or upgrade can occur in the field and/or by untrained personnel. On the other hand, the same night vision systems must be mechanically robust such that they remain operational in harsh environments including combat conditions.

SUMMARY OF THE INVENTION

The present invention concerns an optical system retaining system. In the current embodiment, it is used to ensure that the night vision tube collection optical system cannot be completely unscrewed from the tube housing during focusing, for example. Yet, the retaining system can be removed and then the collection system disassembled from the tube housing without having to fully disassemble the night vision tube system, for example, by removing the tube via the back or proximal side. As a result, the present system eases disassembly and mitigates the risks associated with disassembly, enabling in-field repairs or repairs by untrained personnel.

In a preferred embodiment, the present invention utilizes jam rings that are inserted in front of the night vision tube collection optical system to prevent the collection optical system from becoming inadvertently completely unscrewed from the tube housing. On the other hand, these jam rings can be relatively easily removed from the front side of the system. As a result, the need to access an internal ring from the back side, necessitating removal of the night vision tube, is avoided.

In general, according to one aspect, the invention features a vision augmenting system. It comprises a housing, an optical augmenting element installed within the housing, and a lens system attached to the housing and designed to be focused relative to the optical augmenting element. A detachment prevention system is used to prevent unintended removal of the lens system from the housing during focus adjustment. According to the invention, this detachment prevention system is accessible from outside of the housing.

In the current embodiment, the optical augmenting element is a night vision tube, and the lens system is a collection lens system for collecting light for the optical augmenting element. The detachment prevention system then engages the lens system to prevent it from being completely unscrewed from the housing.

In one example, the detachment prevention system comprises a ring that fits within a relief on the housing. This relief can be formed on an inner or outer wall of the housing.

In another example, an infinity stop nut enables the indexing of a focus position of the lens system relative to the housing, and the detachment prevention system is installed on the infinity stop nut, and a ring fits within a relief on the infinity stop nut.

In general, according to another aspect, the invention features a method for retaining a lens system on a vision augmenting system. This method comprises installing an optical augmenting element within a housing and installing a lens system on the housing that is designed to be focused relative to the optical augmenting element. To prevent unintended removal of the lens system from the housing during focus adjustment, a detachment prevention system is also installed. According to the invention, the detachment prevention system is installed after the optical augmenting element and the lens system have been installed in and on the housing.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
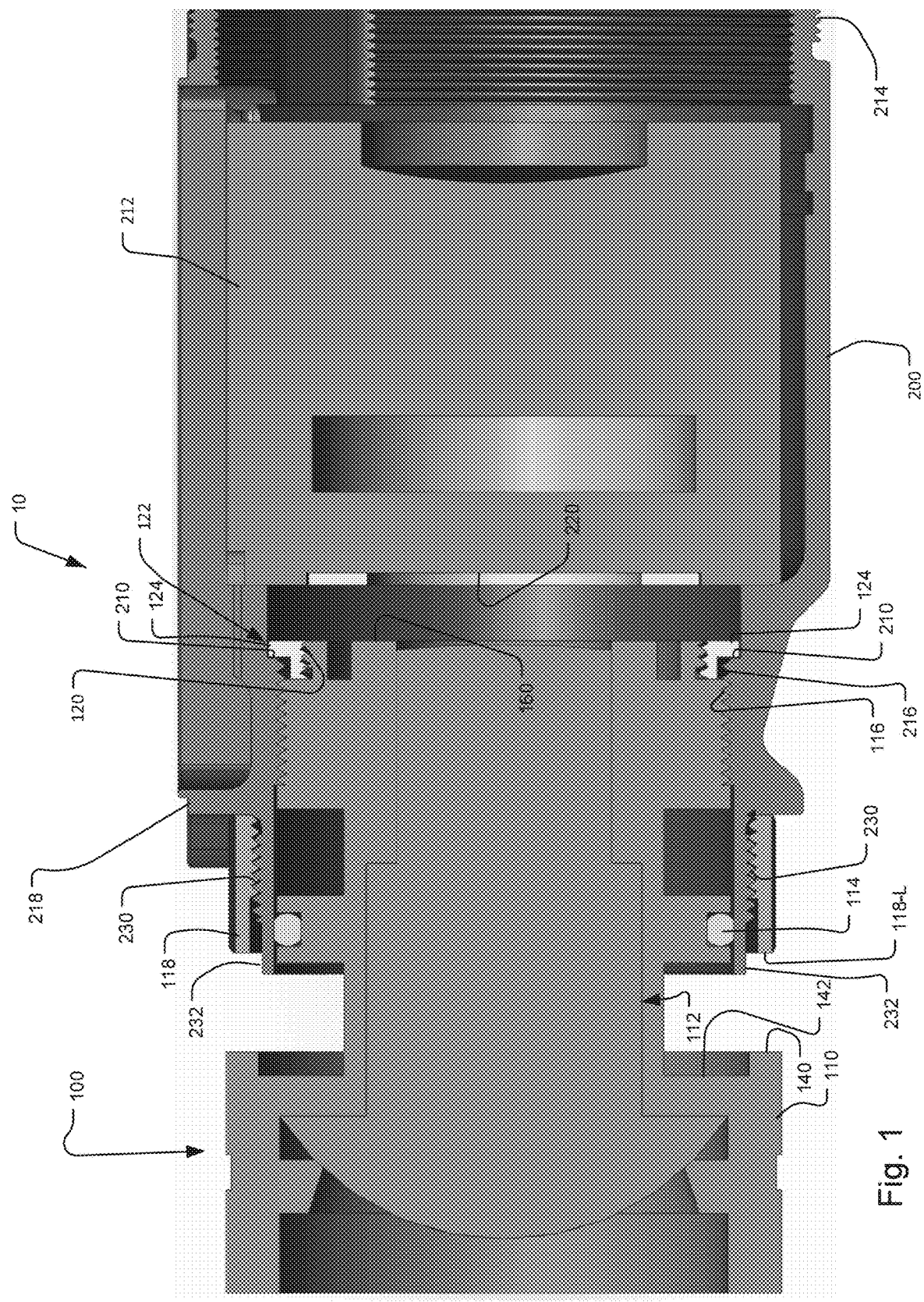
FIG. 1 is a cross-sectional scale view of a night vision system showing the collection optical system and tube housing, illustrating a conventional solution for retaining the collection optical system within the tube housing during operation.

FIG. 1 shows a night vision system in cross-section.

In general, the night vision system 10 comprises a tube housing 200 and a collection optical system 100 mounted (screwed) on the housing 200. Not shown is the eyepiece optical system. In operation, it would mount onto the tube housing 200 via the body eyepiece threads 214. Also not shown is the battery pack that would mount to the battery pack mounting frame 218 of the tube housing 200.

Generally, the collection optical system 100 collects light from the environment. The light is imaged and provided to the night vision tube 212 within the tube housing 200. This night vision tube 212 amplifies the light and provides it to the user via the eyepiece optical system, not shown.

In operation, the collection optical system 100 must be focused. This occurs by the user grasping the focusing ring 110 and rotating the collection optical system 100 relative to the tube housing 200. The rotation of the collection optical system 100 relative to the tube housing 200 causes the collection optical system 100 to move toward or away from the tube 212 by operation of a thread system. Specifically, the collection system focus threads 116 formed on the outer proximal end of the collection optical system 100 engage the body focus threads 216 formed on an internal side of a collection system mount 232 of the tube housing 200. This enables the adjustment of the axial distance between the collection optical system 100 and the tube 212.

It is conventional to include two systems for preventing the improper focusing operation and also to facilitate focusing. First, a stop nut 118 is provided that engages threads 230 on a collection system mount 232 of the tube housing 200. The user typically adjusts the focus position of the collection optical system 100 so that the system 10 is focused at infinity. Then, the stop nut 118 is adjusted so that its leading edge 118-L engages the proximal surface 140 of the collection optical system 100. The stop nut 118 is typically fixed in this position by tightening set screws, not shown, that arrest its further rotation relative to the housing 200. This prevents the proximal end 160 of the collection optical system 100 from being driven against the distal end 220 of the tube 212. This allows the user to adjust the collection optical system 100 to the infinity focus position quickly and repeatedly. Second, an internal ring 122 is provided that prevents the collection optical system 100 from being completely unscrewed from the tube housing 200. Without the internal ring 122, the user could, in seeking to focus the system, inadvertently completely unscrew the collection optical system 100 from the tube housing 200. This is prevented by the internal ring 122.

In more detail, the internal ring 122 installs on the proximal side of the collection optical system 100. Specifically, the internal ring 122 is threaded onto ring threads 120 on the proximal side of the collection optical system 100. This internal ring 122 is accessible only from within the tube housing 200 only from the backside. The internal ring 122 prevents the collection optical system 100 from being completely unscrewed from the tube housing during operation by having its internal ring extension 124 come into engagement with an engagement shoulder 210 of the tube housing 200 at the maximum near focus position for the night vision tube system 10.

Figure 2:
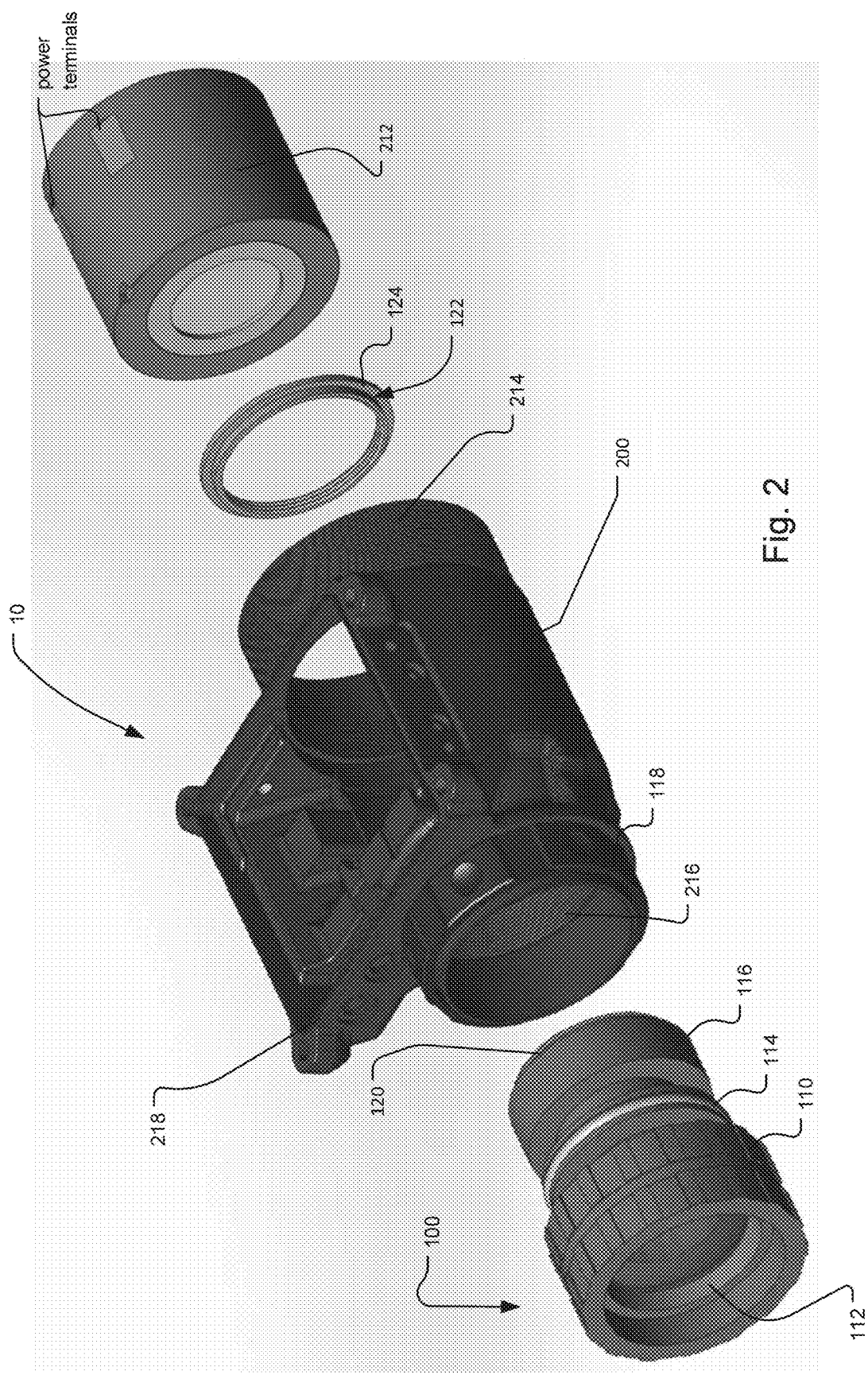
FIG. 2 is a scale exploded view of the night vision system showing the conventional solution for retaining the collection optical system.

FIG. 2 is an exploded view showing the conventional system for retaining the collection optical system 100. As shown during assembly, the collection optical system 100 is screwed into the body focus threads 216 to mate the collection optical signal 100 with the housing 200. Then the internal ring 122 is installed on the collection optical system 100 through the tube housing 200 from the back side. The night vision tube 212 is inserted into the housing 200 after the internal ring 122 is installed.

The general problem with this system is that removal of the collection optical system 100 necessitates the almost complete disassembly of the night vision tube system 10. Specifically, the eye piece optical system must be removed. Then, the tube 212 must be removed from the tube housing 200, This creates a risk of damage to these components. Further, special jigs might be required to remove the internal ring 122.

Figure 3:
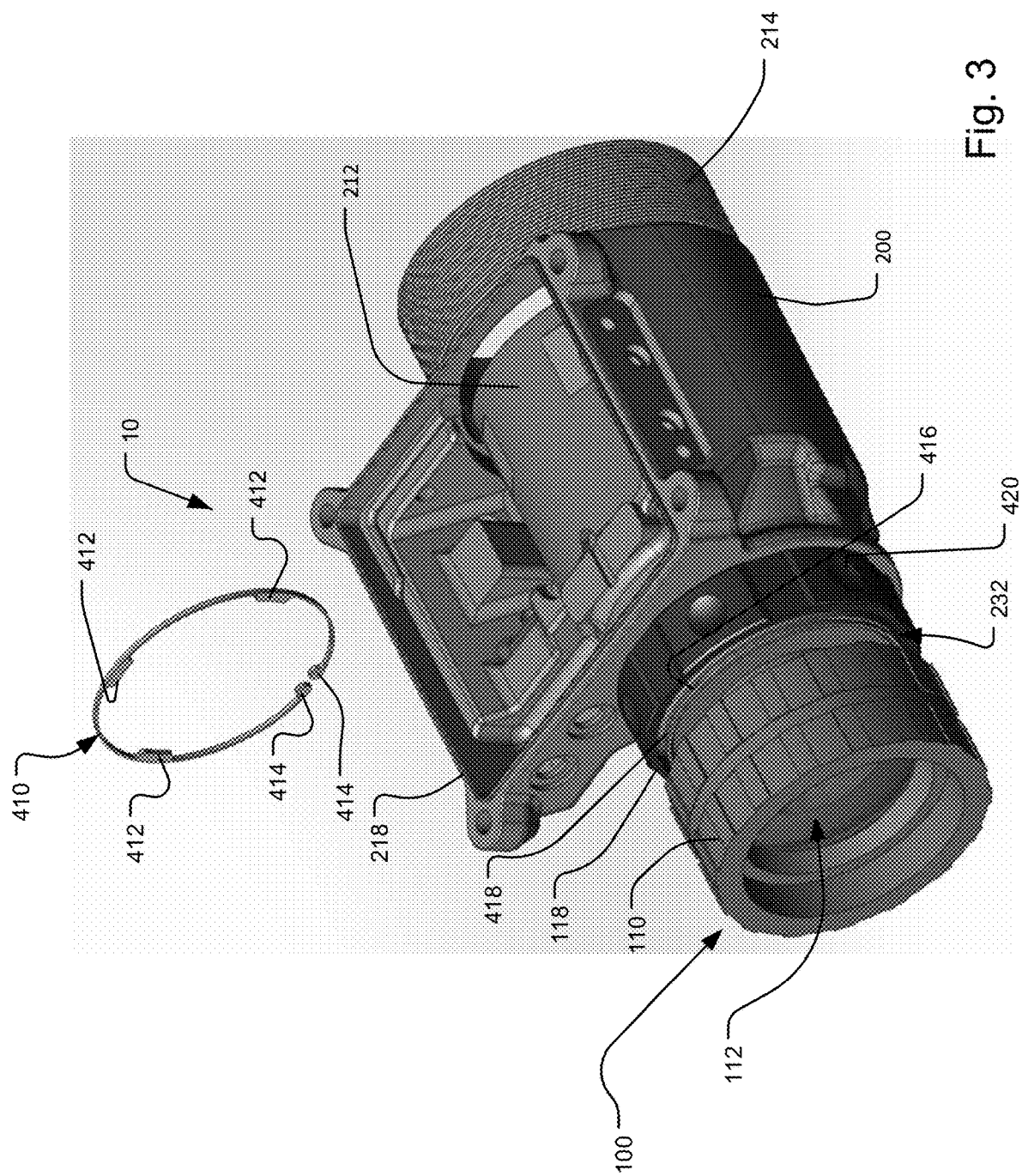
FIG. 3 is a scale perspective view of the night vision system showing an optical system retaining system (external jam ring) of the present invention prior to installation.

FIG. 3 shows the external jam ring embodiment of the optical system retaining system of the present invention.

The external jam ring 410 is an open ring. In the illustrated embodiment it is a circular thin metal band fabricated from spring steel or an aluminum or titanium alloy. The illustrated embodiment shows three integral jam ring tabs 412 projecting radially inward from the outer thin metal band. Further, two jam ring end tabs 414 are provided on either side of the ring's opening.

At the same time, a jam ring annular relief 418 is formed into the exterior wall of the nose of the collection system mount 232 of the tube housing 200 that receives the collection optical system 100. Within the jam ring annular relief 418 are a series of jam ring tab slots 416 that correspond to angular positions of the jam ring tabs 412 and the jam ring end tabs 414 of the external jam ring 410.

Figure 4:
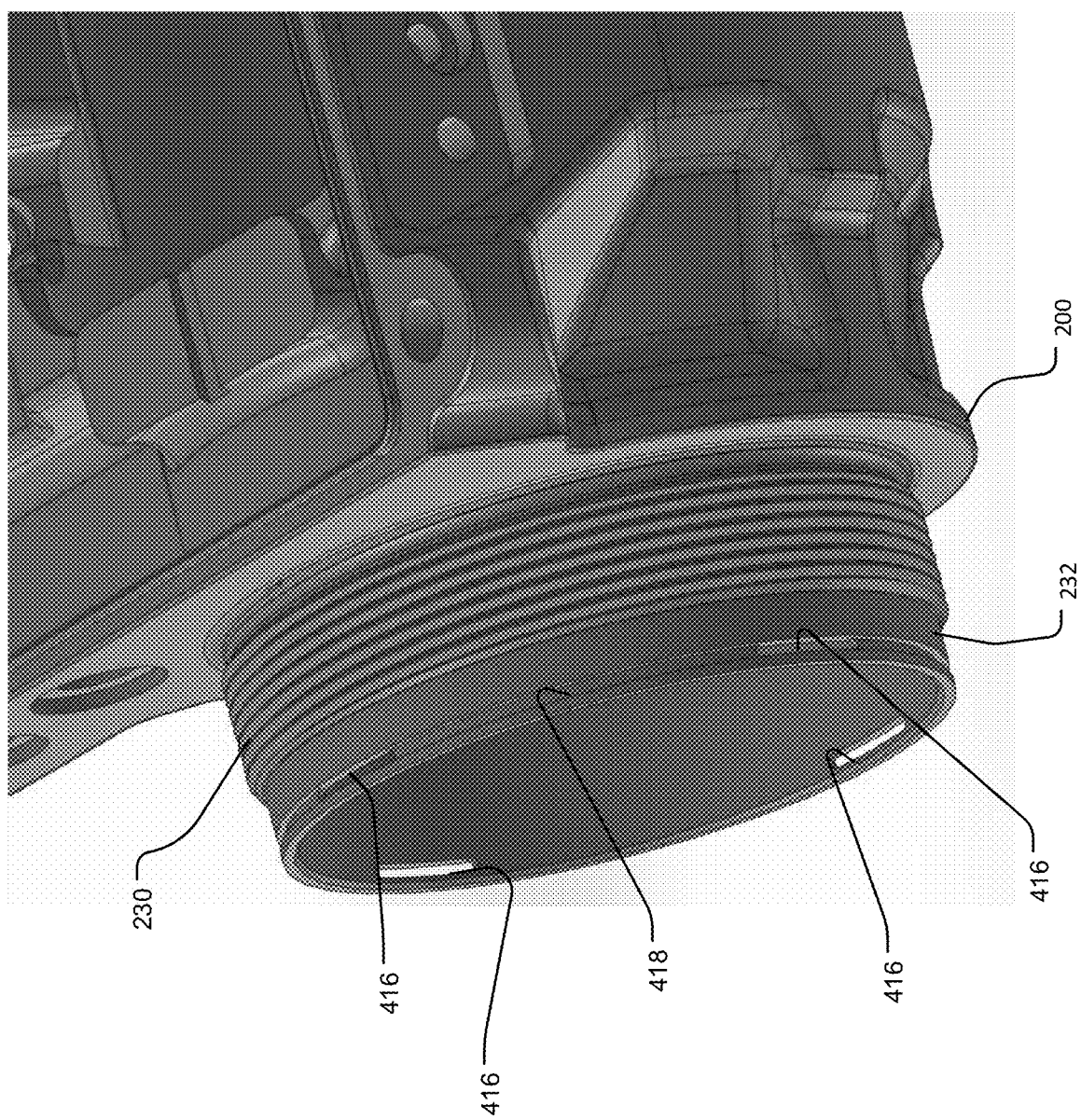
FIG. 4 is a scale partial perspective close-up view showing a jam ring annular relief of the optical system retaining system.

FIG. 4 shows further details of tube housing 200. Specifically, the collection system mount 232 of the tube housing 200 at its distal end has the jam ring annular relief 418. In this relief are four separate jam ring tab slots 416 that receive the jam ring tabs 412 and the jam ring end tabs 414.

Figure 5:
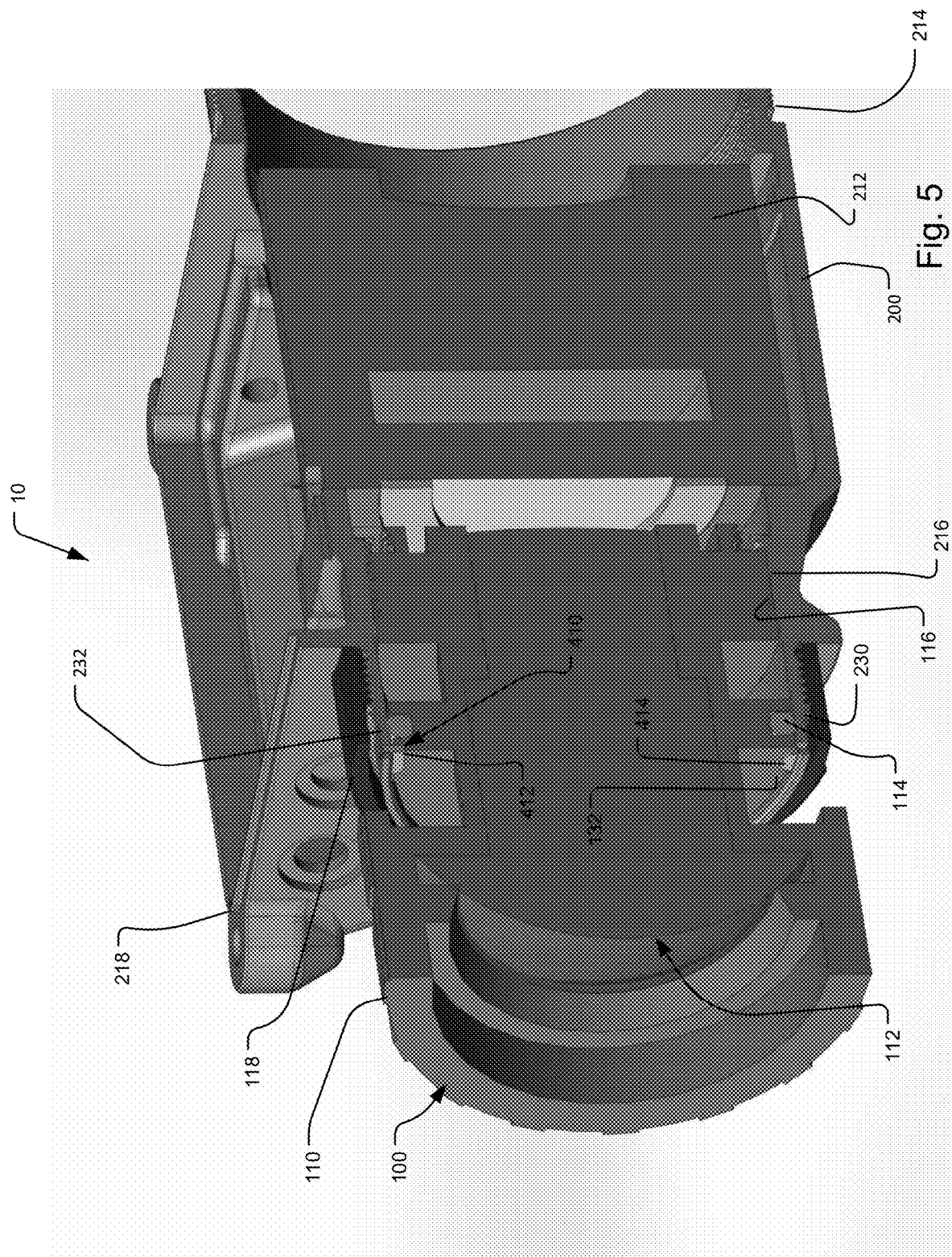
FIG. 5 is a cross-sectional scale view of a night vision tube system showing the optical system retaining system employing the external jam ring.

FIG. 5 shows the external jam ring 410 seated in the jam ring annular relief 418 of the collection system mount portion 232 of the tube housing 200. The jam ring tabs 412 and the jam ring end tabs 414 project through the jam ring slots 416 to engage with a jam ring engagement shoulder portion 132 on the leading distal edge of the collection optical system 100. As a result, mechanical interference between the jam ring tabs 412 and the jam ring end tabs 414 and this shoulder 132 prevent collection optical system 100 from becoming completely unscrewed from the tube housing 200 during an attempt to focus it.

On the other hand, with relatively simple tools, such as needle nose pliers, the external jam ring 410 can be removed from the tube housing 200 allowing the collection optical system 100 to be separated from the tube housing 200 for replacement or cleaning, for example. Access from the back side, dictating removal of the tube 212, is no longer required to remove the collection optical system 100.

Figure 6:
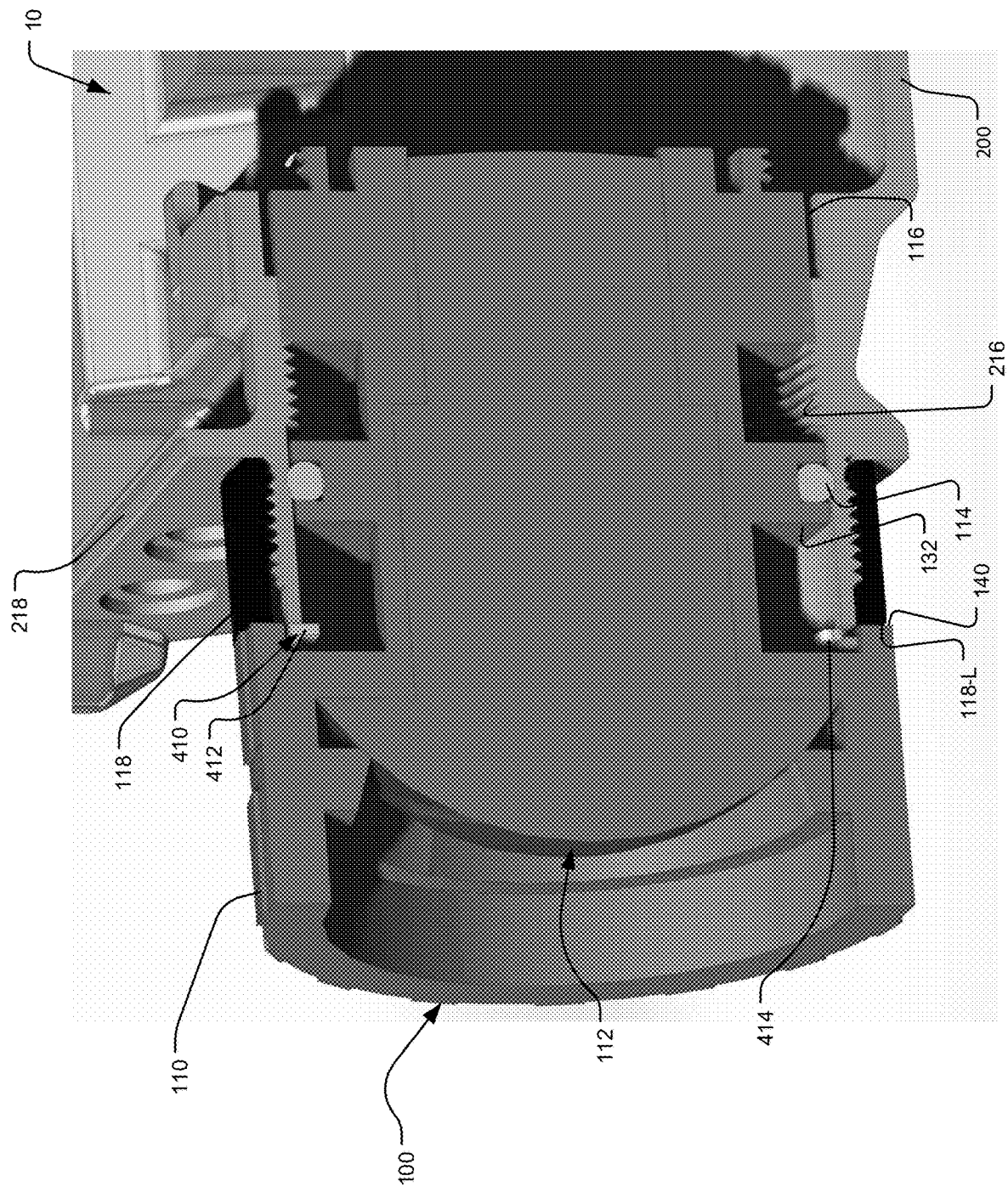
FIG. 6 is a close-up partial cross-sectional scale view showing the external jam ring seated in the housing.

FIG. 6 shows the collection optical system 100 adjusted to an infinity position where an annular distal edge 118-L of the stop nut 118 engages with a back-side surface 140 of the focus ring 110 of the collection optical system 100. In this position, the jam ring 410 is not engaged with the collection optical system 100.

Figure 7:
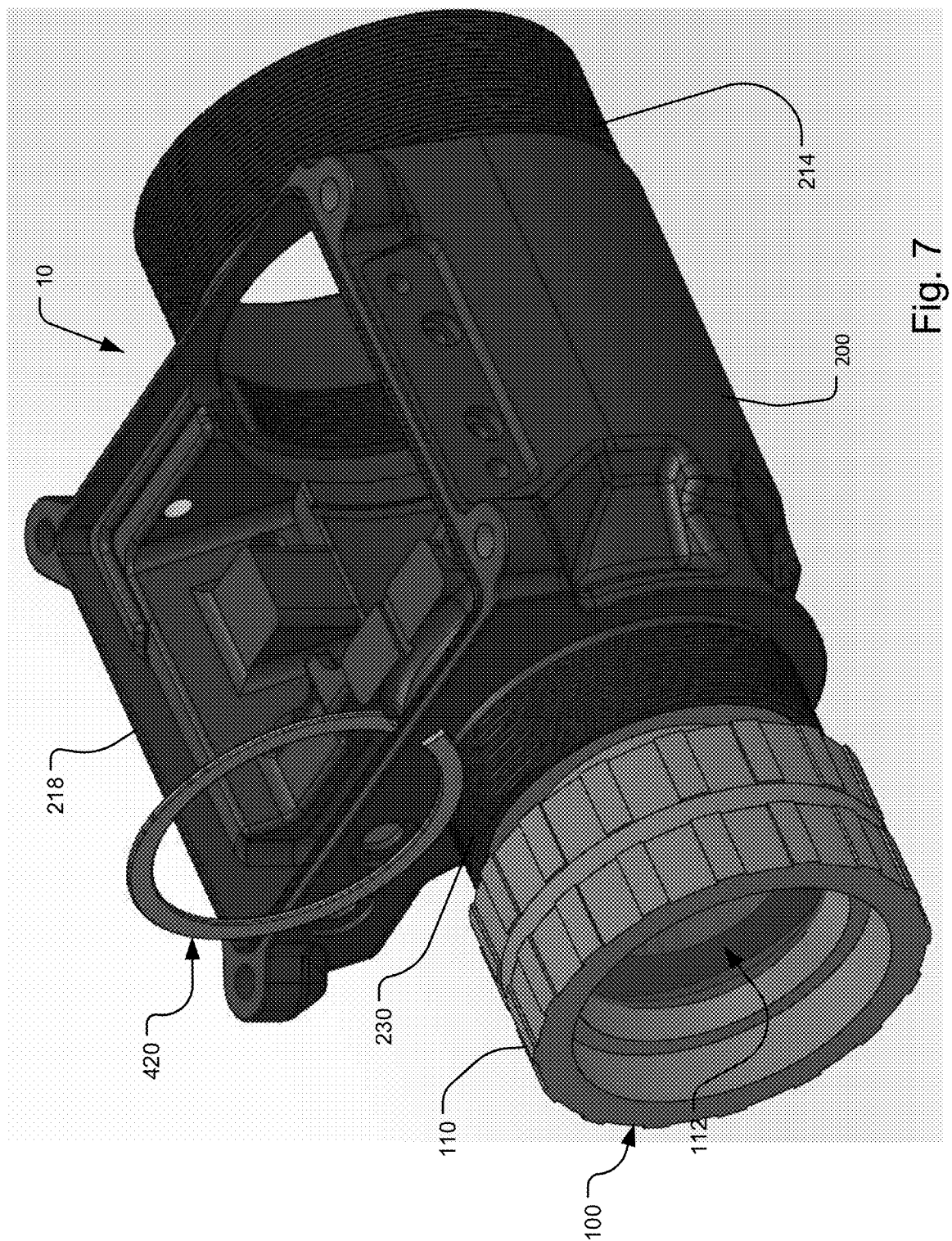
FIG. 7 is a scale perspective view of the night vision system showing the optical system retaining system (internal jam ring) of the present invention.

FIG. 7 shows an internal jam ring embodiment. In one example, the internal jam ring 420 is an open ring fabricated from spring metal or potentially plastic.

Figure 8:
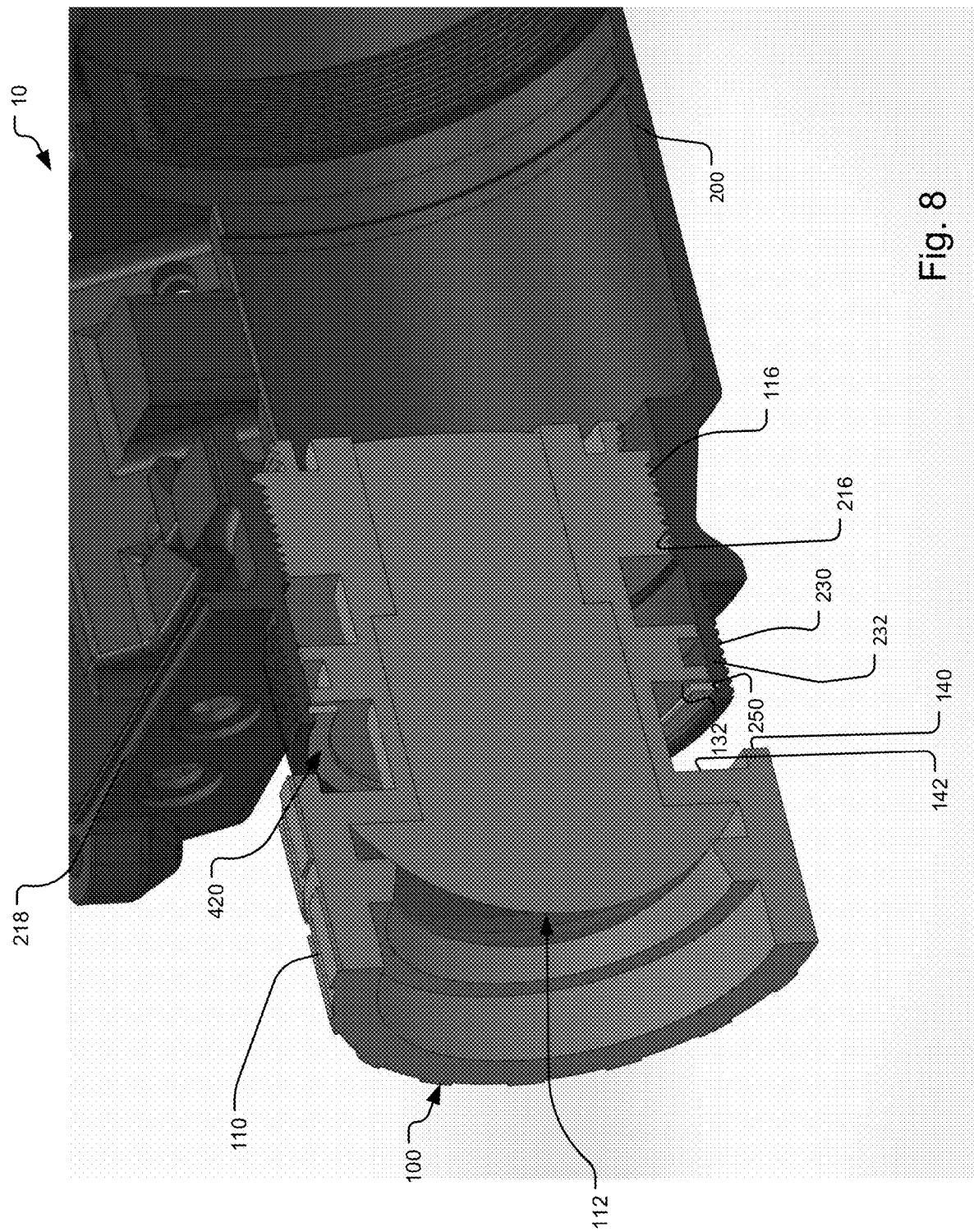
FIG. 8 is a close-up partial cross-sectional scale view showing the internal jam ring seated in the housing.

As shown in FIG. 8, the internal jam ring 420 is installed in an internal annular relief 250 formed on an internal wall of the collection system mount 232 of the tube housing 200. When installed, the internal jam ring 420 prevents the collection optical system 100 from becoming completely unscrewed from the tube housing 200 by engaging the shoulder 132 of the collection optical tube 100.

In one embodiment, during removal of the collection optical system, the internal jam ring is removed using needle nose pliers, for example. In another embodiment, internal jam ring 420 is a consumable plastic part. Specifically, the internal jam ring 420 is removed simply by applying excessive force to unscrew the collection optical system 100 from the tube housing 200. This results in the jam ring breaking.

Figure 9:
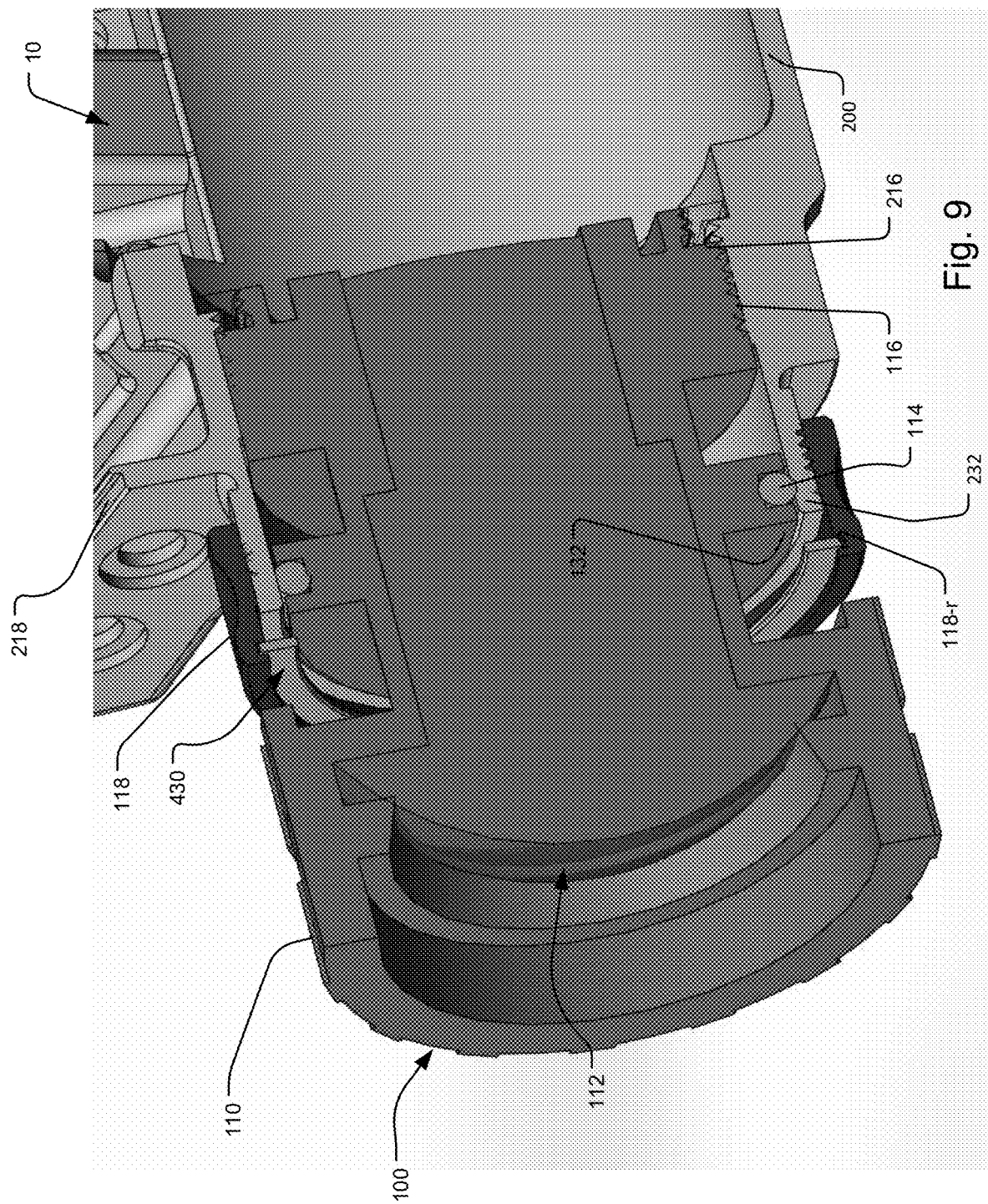
FIG. 9 is a close-up partial cross-sectional scale view of a night vision tube system showing the optical system retaining system employing an infinity stop nut internal jam ring.

FIG. 9 shows an internal jam ring embodiment in which the jam ring 430 is held by the stop nut 118. Here also, the infinity stop nut internal jam ring 430 is an open ring fabricated from spring metal or potentially plastic.

The infinity stop nut internal jam ring 430 is installed in an internal annular relief 118-r formed on an internal wall of the stop nut 118. In operation, the stop nut 118 is screwed onto external threads on the collection system mount of the tube housing. The infinity stop nut internal jam ring 430 prevents the collection optical system 100 from becoming inadvertently completely unscrewed from the tube housing 200 by engaging the jam ring engagement shoulder 132 of the collection optical tube 100.

Here, to remove the collection optical system 100, the collection optical system must be unscrewed in concert with unscrewing the stop nut 118. In this way, unintended or accidental removal of the collection optical system 100 is avoided.

Figure 10:
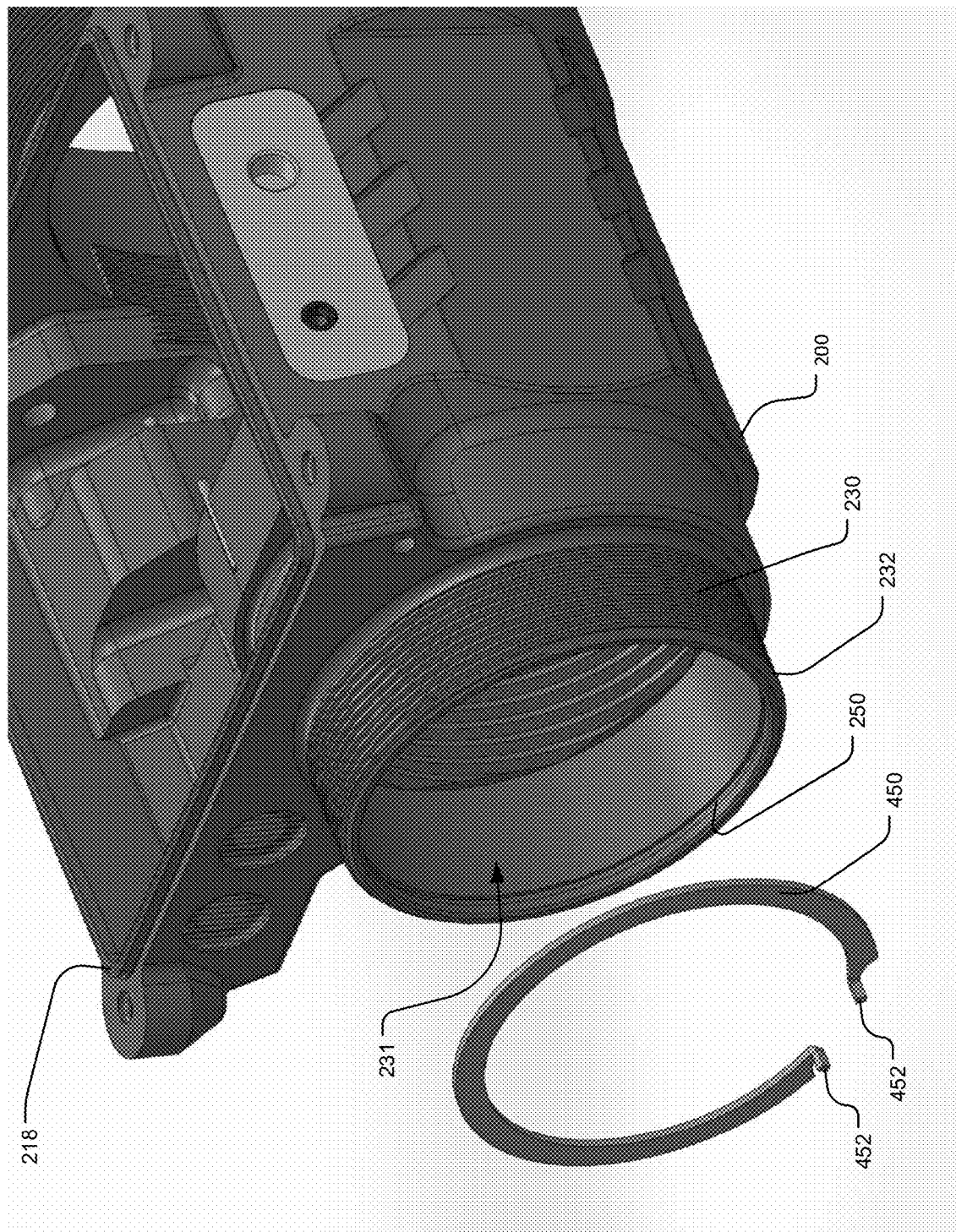
FIG. 10 is a partial scale perspective view of the night vision system showing another embodiment of the internal jam ring of the present invention having compression tabs.

FIG. 10 shows another embodiment of the internal jam ring. In this example, the internal jam ring 450 is also an open ring fabricated from spring metal or potentially plastic. It includes two compression tabs 452 at either end of the open ring 450. These compression tabs are typically bent ends of the ring 450 that are bent at 90 degrees to be parallel to a center axis of the ring 450.

The compression tabs 452 allow the ring 450 to be compressed to reduce its diameter using pliers, for example. When compressed, its diameter is small enough to fit into the bore 231 of the collection system mount 232. The pliers can then release the tabs allowing the ring 450 to expand into the internal annular relief 250 formed on an internal wall of the collection system mount 232 of the tube housing 200.

Figure 11:
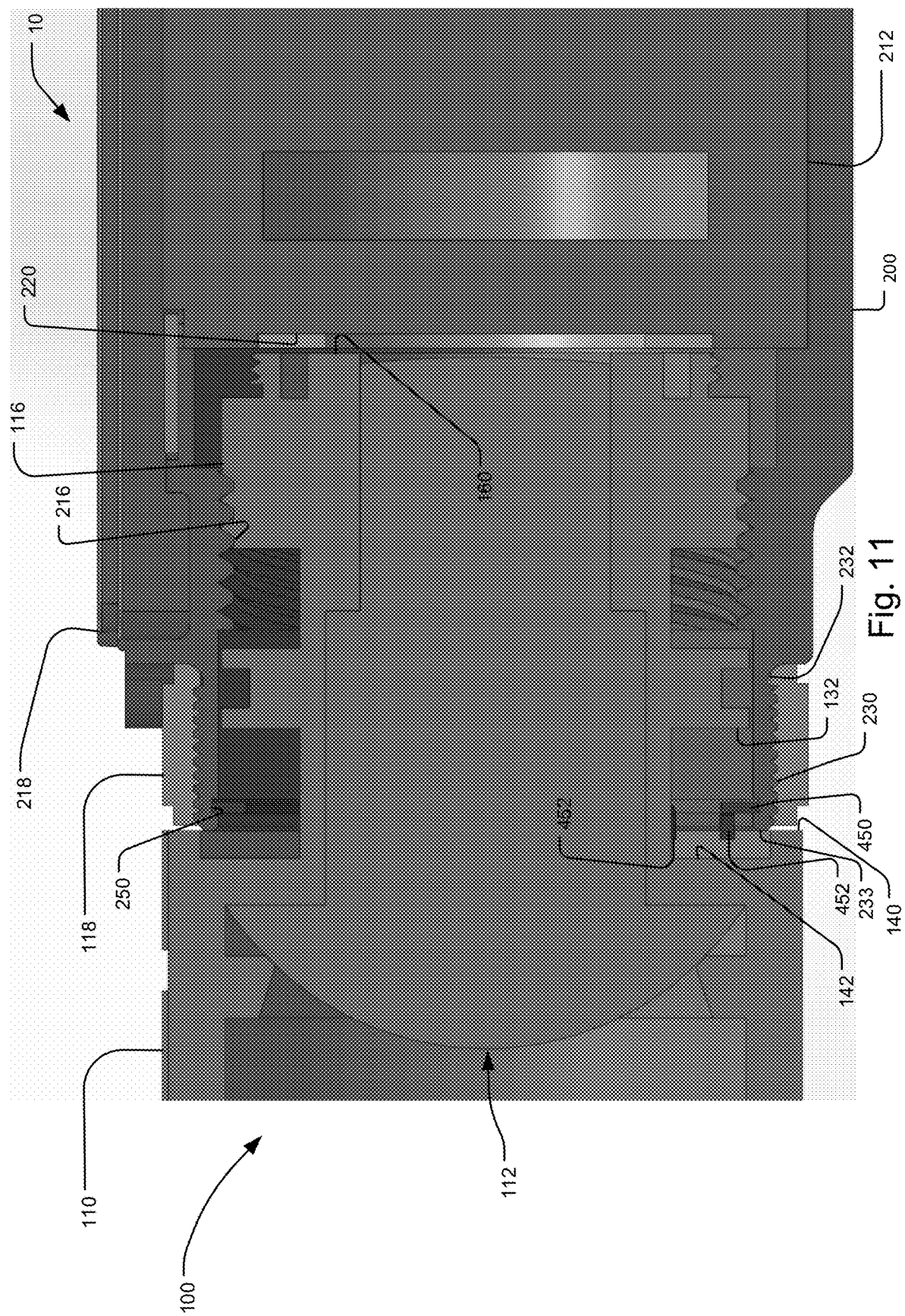
FIG. 11 is a close-up partial cross-sectional scale view showing the internal jam ring with compression tables seated in the housing.

As shown in FIG. 11, the internal jam ring 450 is installed in the internal annular relief 250. When installed, the internal jam ring 450 prevents the collection optical system 100 from becoming completely unscrewed from the tube housing 200 by engaging and interfering the shoulder 132 of the collection optical tube 100 as it is being screwed out of the housing 200.

In this embodiment, during removal of the collection optical system 100, the internal jam ring is first removed using needle nose pliers. As shown, the compression tabs 452 are long enough that they project in the distal direction, beyond the distal end 233 of the collect system mount 232. When the collection optical system 100 is fully screwed into the housing, interference with the compression tabs 420 is avoided since they project into the depression 140, radially inward of the proximal surface 140 of the collection optical system 100.

While this invention has been particularly shown and described with references to preferred embodiments thereof, it will be understood by those skilled in the art that various changes in form and details may be made therein without departing from the scope of the invention encompassed by the appended claims.

What is claimed is:

1. A vision augmenting system, comprising:
   a housing;
   an optical augmenting element installed within the housing;
   a lens system attached to the housing and designed to be focused relative to the optical augmenting element; and
   a detachment prevention system that includes an open jam ring having two compression tabs at either end of the open jam ring wherein said open jam ring is seated in a jam ring annular relief on the housing that prevents unintended removal of the lens system from the housing during focus adjustment, the detachment prevention system being accessible from outside of the housing.

2. The system of claim 1, wherein the optical augmenting element is a night vision tube.

3. The system of claim 1, wherein the lens system is a collection lens system for collecting light for the optical augmenting element.

4. The system of claim 1, wherein the detachment prevention system engages the lens system to prevent it from being completely unscrewed from the housing.

5. The system of claim 1, wherein the detachment prevention system comprises a ring that fits within a relief on the housing.

6. The system of claim 5, wherein the relief is formed on an inner wall of the housing.

7. The system of claim 5, wherein the relief is formed on an outer wall of the housing.

8. The system of claim 1, further comprising a stop nut for indexing a focus position of the lens system relative to the housing.

9. The system of claim 8, wherein the detachment prevention system is installed on the stop nut.

10. The system of claim 8, wherein the detachment prevention system comprises a ring that fits within a relief on the infinity stop nut.

11. A method for retaining a lens system on a vision augmenting system, the method comprising:
    installing an optical augmenting element within a housing;
    installing a lens system on the housing that is designed to be focused relative to the optical augmenting element; and
    preventing unintended removal of the lens system from the housing during focus adjustment by installing a detachment prevention system that includes an open jam ring having two compression tabs at either end of the open jam ring, wherein said open jam ring is seated in a jam ring annular relief on the housing with said detachment prevention system being accessible from outside of the housing after the optical augmenting element and the lens system have been installed in and on the housing.

12. The method of claim 11, wherein the optical augmenting element is a night vision tube.

13. The method of claim 11, wherein the lens system is a collection lens system for collecting light for the optical augmenting element.

14. The method of claim 11, wherein the detachment prevention system engages the lens system to prevent it from being completely unscrewed from the housing.

15. The method of claim 11, wherein the detachment prevention system comprises a ring that fits within a relief on the housing.

16. The method of claim 15, wherein the relief is formed on an inner wall of the housing.

17. The method of claim 15, wherein the relief is formed on an outer wall of the housing.

18. The method of claim 11, further comprising an infinity stop nut for indexing a focus position of the lens system relative to the housing.

19. The method of claim 18, wherein the detachment prevention system is installed on the infinity stop nut.

20. The system of claim 18, wherein the detachment prevention system comprises a ring that fits within a relief on the infinity stop nut.

\* \* \* \* \*